United States Patent
Chellappa

(10) Patent No.: US 9,519,298 B2
(45) Date of Patent: Dec. 13, 2016

(54) MULTI-JUNCTION SEMICONDUCTOR CIRCUIT AND METHOD

(71) Applicant: NXP B.V., Eindhoven (NL)

(72) Inventor: Ananthasayanam Chellappa, Chandler, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/664,562

(22) Filed: Mar. 20, 2015

(65) Prior Publication Data

US 2016/0274604 A1    Sep. 22, 2016

(51) Int. Cl.
*H03B 1/00* (2006.01)
*H03K 3/00* (2006.01)
*G05F 1/10* (2006.01)

(52) U.S. Cl.
CPC ........................................ *G05F 1/10* (2013.01)

(58) Field of Classification Search
CPC ............ G05F 3/262; G05F 3/265; G05F 3/30; G05F 3/267
USPC ......................... 327/538, 539, 512, 513, 509, 540–543,327/530, 108–112, 427, 434, 437; 326/82, 83, 326/87; 374/178
See application file for complete search history.

(56) References Cited

U.S. PATENT DOCUMENTS

| | | | | |
|---|---|---|---|---|
| 7,581,882 B2 * | 9/2009 | Noguchi | ................... | G01K 7/01 327/539 |
| 7,724,068 B1 * | 5/2010 | Smith | .................... | G01K 3/005 327/513 |
| 8,461,912 B1 * | 6/2013 | Kumar | ...................... | G05F 3/30 327/539 |
| 8,723,594 B2 * | 5/2014 | Sakaguchi | ........... | H03K 17/081 327/53 |
| 9,222,843 B2 * | 12/2015 | Schnaitter | ................ | G01K 7/01 |
| 2006/0091875 A1 | 5/2006 | Kimura | | |
| 2006/0103449 A1 | 5/2006 | Watanabe et al. | | |

(Continued)

FOREIGN PATENT DOCUMENTS

EP     2295944 A2    3/2011

OTHER PUBLICATIONS

IEEE Standard 1149.1—2001 IEEE Standard Test Access Port and Boundary-Scan Architecture.

(Continued)

*Primary Examiner* — Lincoln Donovan
*Assistant Examiner* — Thomas Skibinski

(57) ABSTRACT

Aspects of the present disclosure are directed to methods, apparatuses and systems involving a multi junction semiconductor circuit. According to an example embodiment, an apparatus includes a multi junction semiconductor circuit including a first current path and a second current path, each current path having respective first and second common voltage nodes to provide an output that is proportional to absolute temperature. The first current path includes a first p-n junction exhibiting a first current density. The second current path includes a second p-n junction exhibiting a second current density that is proportionally different than the first current density, and a resistor connected between the second p-n junction and the second common voltage node. Further, the apparatus includes a current-tap path connected to a node between the resistor and the second p-n junction, the current-tap path diverts a portion of current that flows through the resistor away from the second p-n junction.

20 Claims, 2 Drawing Sheets

(56) References Cited

U.S. PATENT DOCUMENTS

| | | | |
|---|---|---|---|
| 2006/0190210 A1* | 8/2006 | Mukherjee | G01K 1/026 702/130 |
| 2007/0070760 A1* | 3/2007 | Kim | G11C 7/04 365/212 |
| 2007/0159237 A1* | 7/2007 | Zimlich | G05F 3/30 327/539 |
| 2008/0061865 A1* | 3/2008 | Koerner | G01K 7/01 327/512 |
| 2008/0259990 A1* | 10/2008 | Takeuchi | G01K 7/01 374/1 |
| 2009/0256623 A1* | 10/2009 | Tajima | G05F 3/30 327/512 |
| 2013/0235903 A1 | 9/2013 | Wong et al. | |
| 2013/0241526 A1 | 9/2013 | Ozasa et al. | |

OTHER PUBLICATIONS

Extended European Search Report for Patent Appln. No. 16153914.3 (Jul. 25, 2016).

\* cited by examiner

MULTI-JUNCTION SEMICONDUCTOR CIRCUIT AND METHOD

Aspects of various embodiments are directed to integrated circuit apparatuses and more particularly to apparatuses and methods having a multi junction semiconductor circuit.

Many integrated circuits (ICs) employ a thermal shutdown circuit to prevent damage to the IC. A thermal shutdown circuit can signal to cease current-conduction due to a die-temperature exceeding a threshold value. For example, a power-management IC can use a thermal shutdown circuit to prevent overheating under certain power conditions. For many applications, it is desirable to cease current-conduction in response to the die-temperature exceeding the threshold value. Shutting down the circuit can, for instance, prevent or minimize damage to components of the circuit.

Thermal shutdown circuits and related approaches as noted above have been useful for preventing and/or minimizing damage to the IC caused by a high temperature condition. However, facilitating such thermal shutdown circuits in an IC can be challenging or costly to implement. Further, many applications require large die area, which can be undesirable. These and other matters have presented challenges to IC design, thermal shutdown circuits and implementation, for a variety of applications.

Various example embodiments are directed to integrated circuits and their implementation. According to an example embodiment, an apparatus includes a multi-junction semiconductor circuit including a first current path and a second current path, each current path having respective first and second common voltage nodes used to provide an output that is proportional to absolute temperature. The first current path includes a first p-n junction exhibiting a first current density. The second current path includes a second p-n junction exhibiting a second current density that is proportionally different than the first current density, and includes a resistor connected between the second p-n junction and the common voltage node in the second current path. The apparatus further includes a current-tap path connected to a node between the resistor and the second p-n junction. The current-tap path diverts a portion of current that flows through the resistor away from the second p-n junction. In various such implementations, the resistor is made to appear larger than its physical value by adding and subtracting currents via the current-tap path in such a way that the rest of the circuit is unaffected.

According to another example embodiment, an apparatus includes a multi junction semiconductor circuit including first and second current paths each having a current source and a p-n junction via which current generated by the current source passes. The p-n junctions exhibit current densities that are different. The apparatus includes an impedance circuit in the second current path that has a first terminal connected to the current source in the second current path and a second terminal connected to the p-n junction in the second current path. The apparatus further includes a feedback circuit to set a voltage at the p-n junction in the first current path and a voltage at the first terminal to a value that is about equal. Further, the apparatus includes a current-tap path connected to the second terminal of the impedance circuit. The current-tap path diverts a portion of current that flows from the current source in the second path away from the second p-n junction and provides current flowing through the impedance circuit that is proportional to absolute temperature, based on a difference between forward-biased junction voltages of the p-n junctions.

According to a further example embodiment, a method includes passing respective currents through first and second current paths. Each current path has respective first and second common voltage nodes that provide an output that is proportional to absolute temperature. The method includes exhibiting, via a first p-n junction in the first current path, a first current density, and exhibiting, via a second p-n junction in the second current path, a second current density that is proportionally different than the first current density. For example, passing current through the second current path includes passing current through a resistor connected between the second p-n junction and the common voltage node in the second current path, and diverting a portion of current that flows through the resistor away from the second p-n junction, at a node connected between the resistor and the second p-n junction.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which:

DETAILED DESCRIPTION

Figure 1:
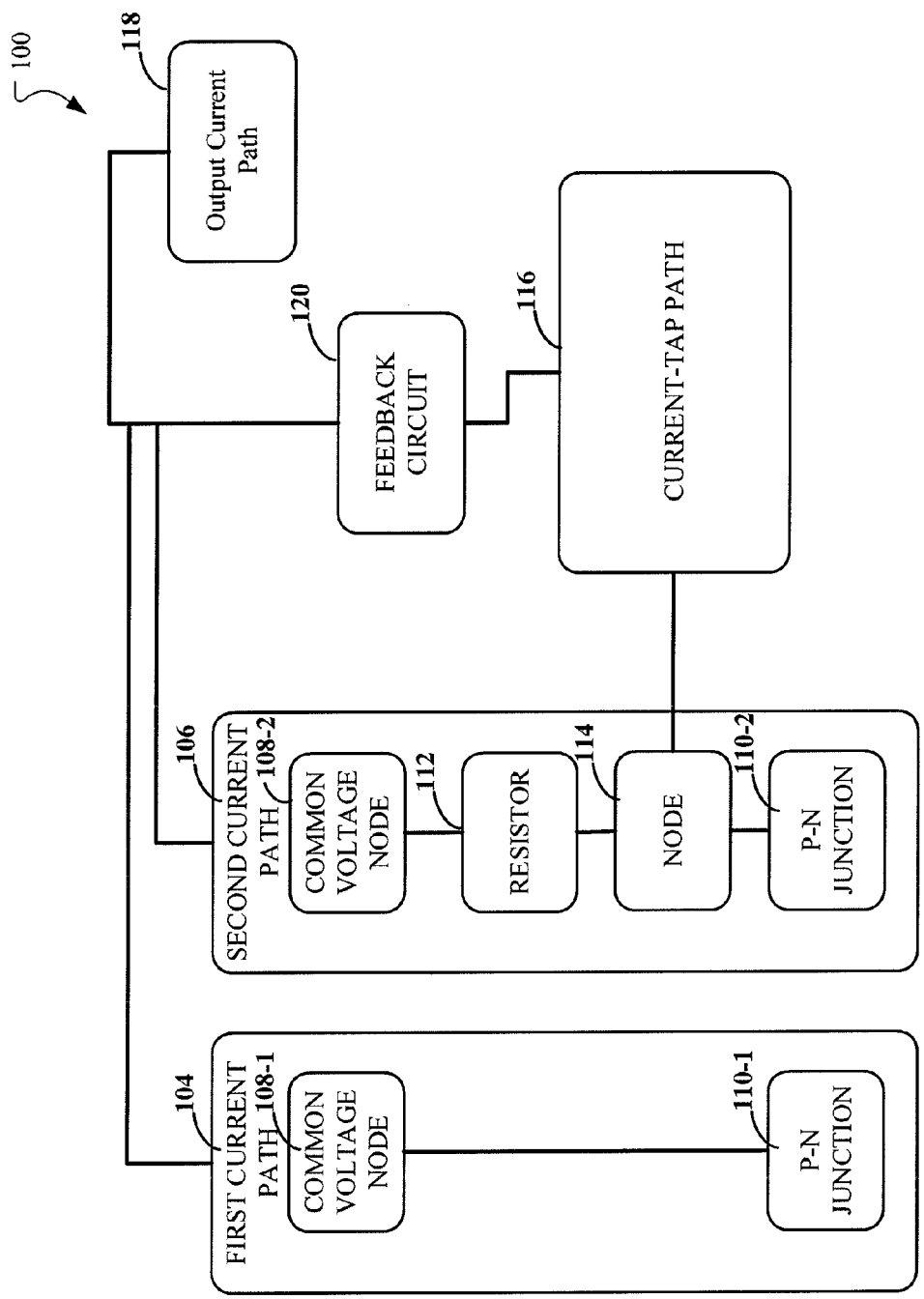
FIG. 1 shows an example apparatus according to various embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving a multi junction semiconductor circuit that provides an output that is proportional to absolute temperature, based on a voltage difference between respective p-n junctions. A generated current is passed through a current path including a resistor and one of the p-n junctions, with current through the resistor providing the output. A portion of the current is diverted away from the p-n junction in the current path with the resistor. Such an approach can be implemented to provide the output using a relatively smaller resistor, as facilitated via the diversion of current (e.g., and as relative to a larger resistor as may be required, absent the diversion). In such contexts, the resistor is made to appear larger than its physical value via the diverted current, which can be carried out without affecting the rest of the circuit (e.g., relative to voltage differentials between the p-n junctions). In certain implementations, such an apparatus and approach can be used in the context of thermal sensing circuitry, which provides an output based on detected temperature relative to a threshold, using the output. These and other aspects can be implemented to address challenges, including those discussed in the background above. While not necessarily so limited, various aspects may be appreciated through a discussion of examples using such exemplary contexts.

Various embodiments such as those discussed above are implemented in an IC that employs a thermal shutdown circuit to prevent damage to the IC, such as by signaling to cease current-conduction due to a die-temperature exceeding a threshold value. In various instances, such a thermal shutdown circuit generates a current that is proportional to the difference in forward-biased junction voltages (Vbe) of two diodes or bipolar junction transistors (BJT) having different current densities. The differential voltage is proportional to absolute temperature (PTAT), and the resulting current can be copied and passed to another resistor to effectively gain up the PTAT voltage. The gained PTAT voltage is compared with a reference voltage to detect when the temperature is above the reference voltage (e.g., a threshold value).

According to various example embodiments, aspects of the present disclosure are directed to an apparatus including a multi-junction semiconductor circuit having a first and a second current path. Each current path includes a common voltage node used to provide an output that is proportional to absolute temperature and a p-n junction. The p-n junctions of the two current paths can exhibit different current densities. A current-tap path is connected to the second current path to divert a portion of current that flows through a resistor of the second current path away from the p-n junction of the second current path. In various implementations, by diverting the current that flows through the transistor away from the p-n junction, a relative size of the resistor can be smaller, relative to not diverting the current away. Thereby, an overall area required for the resistor can be limited.

The current-tap path can include a current mirror circuit to generate the diverted portion of current as current that proportionally mirrors current in the second current path. A third current path can mirror the current flow through the transistor. The third current path can include a resistor, a current source, and a comparator connected between the current source and the resistor. The comparator can compare a voltage at a node in the third current path to a threshold. As the resulting current flowing through the resistor of the second current path is mirrored to the third current path, the current is passed onto the resistor in the third current path to effectively gain up the voltage at the node of the third current path. The voltage at the node of third current path can be used as an indication of a value that is proportional to absolute temperature. The comparator may, for example, generate an over-temperature output in response to the voltage at the node of the third current path exceeding the threshold. In certain embodiments, such an approach is implemented to cease current-conduction in response to the over-temperature output.

In various embodiments, an apparatus includes a multi-junction semiconductor circuit that includes a first current path and a second current path. The first current path has a first common voltage node and the second current path has a second common voltage node. The first and second common voltage nodes are used to provide an output that is proportional to absolute temperature. The first current path includes a first p-n junction that exhibits a first current density, and the second current path includes a second p-n junction that exhibits a second current density that is proportionally different than the first current density. The second current path also includes a resistor connected between the second p-n junction and the second common voltage node. The apparatus further includes a current-tap path connected to a node between the resistor and the second p-n junction. The current-tap path diverts a portion of current that flows through the resistor away from the second p-n junction.

The first and second p-n junctions can be arranged with the resistor and the common voltage nodes to flow current through the resistor that is proportional to a voltage difference between a junction voltage of the first p-n junction and a junction voltage of the second p-n junction. The voltage difference is proportional to absolute temperature, which can be used to provide an indication of circuit temperature. In this context, the current diverted from the second current path via the current tap path can be proportional to the voltage difference and the absolute temperature. In certain implementations, the first and second p-n junctions can include first and second diodes (or BJTs).

In some embodiments, one or more of the current paths include a current source. For instance, the first and the second current paths include current sources having transistors that control flow in the first and the second current paths. Further, in some embodiments, the first current path, the second current path, and the current-tap path include respective current sources and each current source has a transistor that controls current flow. The transistors in the current sources, in various embodiments, can include p-type metal-oxide-semiconductor (PMOS) transistors.

In various embodiments, the current-tap path includes a current mirror circuit that generates the diverted portion of current as a current that proportionally mirrors current in the second path. In various embodiments, the current-tap path includes a current source. The current source in the current-tap path, for example, generates an amount of current that matches an amount of current generated by the current source in the second current path. The current mirror circuit generates the diverted portion of current that is a fraction of current generated by the current source in the current-tap path.

In some embodiments, the transistor in the current source of the current-tap path includes a PMOS transistor and the current mirror circuit includes n-type metal-oxide-semiconductor (NMOS) transistors having gates connected together and to a drain of the PMOS transistor. A first one of the NMOS transistors has its drain connected to the drain of the PMOS transistor in the current-tap path, and a second one of the NMOS transistors has its drain connected to the second common voltage node in the second current path as noted above. This second NMOS transistor diverts current from the second common voltage node, the diverted current being generated as a fraction of current flowing through the first NMOS transistor.

Various embodiments involve additional circuits/paths with respect to a multi junction semiconductor circuit as discussed above. For instance, an apparatus can include a feedback circuit. The feedback circuit sets the gate-source voltage by driving transistors that respectively operate as current sources for each current path. In various embodiments, the feedback circuit includes an amplifier having its inputs connected to the first and second common voltage nodes, and its output connected to the gates of the transistors. The amplifier controls current flowing through the current paths in a manner that maintains the common voltage nodes at a common voltage. In this context, current flowing through the respective p-n junctions provides a voltage difference between the respective junctions (e.g., forward-biased voltages of each junction), and the resulting voltage drop across the resistor in the second current path mimics the voltage difference.

In various embodiments, the apparatus includes a third current path that mirrors current flowing throw the resistor in the second current path. A voltage node in the third current path exhibits a voltage that is proportional to a voltage difference between junction voltages of the first and second p-n junctions, and thus provides an indication of the voltage difference that can be used in generating an output (e.g., via comparison to a reference such as a bandgap reference via a comparator). If the voltage difference exceeds a threshold, the comparator generates an over-temperature output, which can be used for a variety of purposes such as to alter or shut down operation of a circuit. In some embodiments, a current source in the third current path has a transistor that controls current flow in the path, in accordance with current flowing through the resistor in the second current path (e.g., as a copied current that may be gained up). In such embodiments, the first, second, and third current paths include respective current sources having transistors that control current flow in the respective current paths, with a feedback circuit setting the common voltage nodes to a common voltage by driving gates of the transistors.

Certain embodiments are directed to a circuit operable for use with a multi junction semiconductor circuit having first and second current paths each having a current source and a p-n junction that exhibit different current densities, with an impedance circuit having respective terminals connected between the current source and p-n junction in the second current path. A feedback circuit sets a voltage at the p-n junction in the first current path and voltage at the first terminal to a value that is about equal. The apparatus includes a current-tap path connected to the second terminal of the resistor, and diverts current flowing in the second current path, from the resistor and away from the p-n junction therein. Accordingly, the current-tap path facilitates current flowing through the impedance circuit based on a difference between forward-biased junction voltages of the p-n junctions, which can effectively make the impedance circuit appear larger, relative to the amount of current flowing through the resistor and a resulting indication of a voltage differential between the p-n junctions, while reducing the amount of current actually flowing through the p-n junction in the second circuit. This current flowing through the impedance circuit is proportional to absolute temperature, and accordingly can be used as an indication of temperature.

In accordance with various method-based embodiments, currents are passed through first and second current paths respectively having first and second common voltage nodes that provide an output that is proportional to absolute temperature. A first-p-n junction in the first current path exhibits a first current density, and a second p-n junction in the second current path exhibits a second current density that is proportionally different than the first current density. The current passed through the second current path is passed through a resistor connected between the second p-n junction and the second common voltage node in the second current path, with the current being proportional to a voltage difference between junction voltages of the p-n junctions (which is proportional to absolute temperature).

A portion of current that flows through the resistor is diverted away from the second p-n junction, at a node connected between the resistor and a second p-n junction. The current may, for example, be diverted using a current mirror circuit that generates current that proportionally mirrors current in the second current path. For instance, a current source may be used to generate an amount of current that about matches an amount of current generated in the second current path, via which the current mirror circuit generates the diverted portion as a fraction of generated current.

In some embodiments, current flowing through first and second current paths as noted above is controlled based on feedback from the common voltage nodes and a voltage difference between forward-biased junction voltages of the p-n junctions. The feedback can be used to maintain the common voltage nodes at a common voltage, such as by using a feedback circuit to control current flow in the current paths. Diverting current in this regard can include providing a voltage drop across the resistor that mimics the voltage difference by controlling current flow through the resistor and through the second p-n junction.

In accordance with some embodiments, current that flows through the resistor in the second current path is mirrored and used to generate a voltage that is proportional to a difference between junction voltages of the p-n junctions. This generated voltage generated can be compared to a threshold, and used to provide an output indicative of temperature.

Turning now to the figures, FIG. 1 shows an apparatus 100 as may be implemented in accordance with one or more embodiments of the present disclosure. The apparatus 100 has a first current path 104 and a second current path 106. Each current path 104, 106 includes a common voltage node 108-1, 108-2 used to provide an output that is proportional to absolute temperature. The first current path 104 includes a first p-n junction 110-1 and the second current path 106 includes a second p-n junction 110-2. The p-n junctions 110-1, 110-2 may, for example, be implemented as bipolar transistors, diodes, or bipolar transistors configured as diodes. The first p-n junction 110-1 exhibits a first current density and the second p-n junction 110-2 exhibits a second current density. The second current density can be proportionally larger than the first current density.

The second current path 106 includes a resistor 112 connected between the second p-n junction 110-2 and the second common voltage node 108-2. A current-tap path 116 is connected to a node 114 between the resistor 112 and the second p-n junction 110-2, and diverts a portion of the current that flows through the resistor 112 away from the second p-n junction 110-2. The current-tap path 116 provides a voltage drop across the resistor 112 that mimics the voltage difference (e.g., a voltage difference between the junction voltage of the first p-n junction 110-1 and a junction voltage of the second p-n junction 110-2) by controlling current flow through the resistor 112 and through the second p-n junction 110-2. In this manner, the current through the terminal of the resistor 112 is reduced while other voltages are unchanged and the resistor 112 can appear larger, to the second p-n junction 110-2, than the resistor is. The diverted portion can, for example, be a predefined amount of current.

The current that flows through the resistor 112 can be proportional to a voltage difference between a junction voltage of the first p-n junction 110-1 and a junction voltage of the second p-n junction 110-2. The voltage difference, as used herein, can be proportional to absolute temperature. A junction voltage, in some embodiments, can include a forward-biased junction voltage of a p-n junction.

In various embodiments, the current-tap path 116 includes a current mirror circuit and a current source. The current mirror circuit generates the diverted portion of current as a current that proportionally mirrors current in the second current path 106. The current source in the current-tap path 116 controls flow in the current-tap path 116 and generates an amount of current that matches an amount of current in the second current path 106. For example, the current mirror circuit can generate the diverted part of current by generating current that is a fraction of current generated by the current source in the current-tap path 116. In various embodiments, as may be implemented in a manner similar to the apparatus shown in FIG. 2, the current mirror circuit includes first and second NMOS transistors and the current source has a PMOS transistor.

In various embodiments, the apparatus includes an output current path 118 that mirrors (e.g., mimics) current that flows through the resistor 112 in the second current path 106. A voltage is generated in the output current path, and that is proportional to a voltage difference between the junction voltages of the first p-n junction 110-1 and the second p-n junction 110-2. In a number of embodiments, the output current path 118 includes a comparator that compares the generated voltage therein to a threshold (e.g., a bandgap threshold). The comparator can generate an over-temperature output based on the voltage exceeding the threshold, such as to alter operation or cease current-conduction of a circuit.

In some embodiments, the apparatus 100 includes a feedback circuit 120 that sets the common voltage nodes 108-1, 108-2 to a common voltage. For example, the first current path 104, the second current path 106, and (when implemented) the output current path 108 can include current sources having transistors, and the feedback circuit can drive gates of the transistors based on voltages at common voltage nodes 108-1, 108-2. This maintains the common voltage nodes 108-1, 108-2 at a common voltage and provides a voltage difference between a forward-biased junction voltage of the first p-n junction and a forward-biased junction voltage of the second p-n junction that is proportional to absolute temperature.

Figure 2:
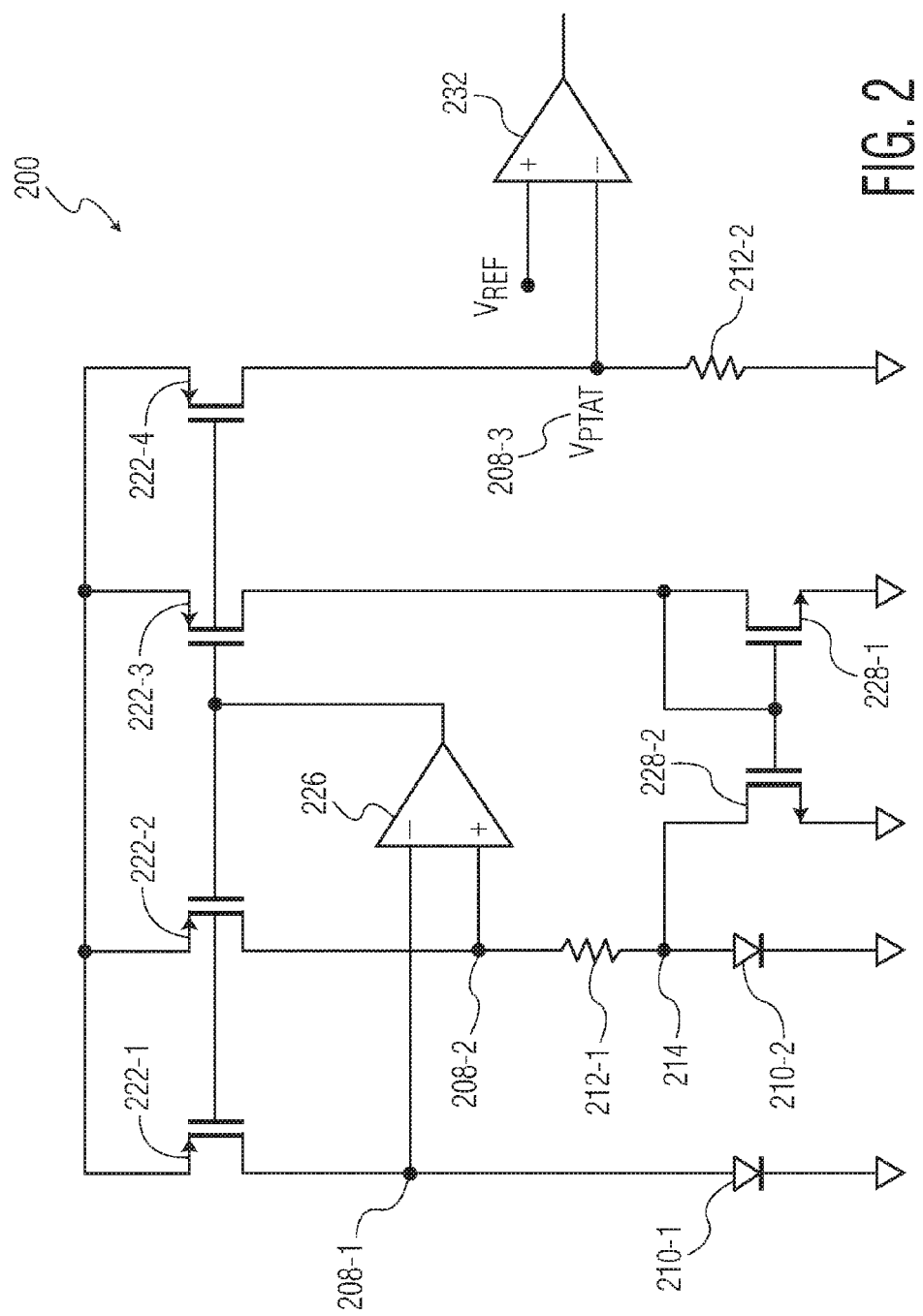
FIG. 2 shows an example apparatus according to various embodiments of the present disclosure.

FIG. 2 shows an apparatus 200 as may be implemented in accordance with one or more embodiments of the present disclosure, and provides an output indicative of temperature. As may be implemented with the apparatus shown in FIG. 2, example apparatus embodiments include a multi-junction semiconductor circuit that includes a first current path and a second current path that exhibit different current densities, and a current-tap path to divert a portion of current away from the second current path.

The apparatus 200 includes a common voltage node 208-1, a p-n junction 210-1, and a current source having a transistor 222-1 (e.g., a PMOS transistor). The transistor 222-1 is connected to p-n junction 210-1 shown implemented as a diode. The drain of the transistor 222-1 is connected to the anode of the p-n junction 210-1. The apparatus also includes common voltage node 208-2, a p-n junction 210-2, a resistor 212-1, and a current source having a transistor 222-2. The p-n junction 210-2, also implemented as a diode, exhibits a current density that is proportionally larger than the first current density (e.g., 8 times). The drain of transistor 222-2 is connected to an input terminal of the resistor 212-1, and an output terminal of the resistor 212-1 connected to the p-n junction 210-2.

A current-tap path is connected to a node 214 between the resistor 212-1 and the p-n junction 210-2, and diverts a portion of current that flows through the resistor 212-1 away from the p-n junction 210-2. The current-tap path includes a current mirror circuit implemented with NMOS transistors 228-1 and 228-2. A current source including PMOS transistor 222-3 supplies the current mirror circuit. The gates of NMOS transistors 228-1 and 228-1, as well as the drain of the NMOS transistor 228-1, are connected to the drain of the PMOS transistor 222-3. NMOS transistor 228-2 has its drain connected to the common voltage node 208-2 and generates the diverted portion of current as a fraction of current flowing through NMOS transistor 228-1.

A feedback circuit includes an amplifier 226 having its inputs connected to the common voltage nodes 208-1 and 208-2, and its output connected to drive the PMOS transistors 222-1, 222-2, and 222-3, as well as PMOS transistor 222-4 of a further current source. The amplifier 226 controls flow in the respective current sources, and maintains the common voltage nodes 208-1, 208-2 at a common voltage. A voltage difference is thus provided between the junction voltages of the p-n junctions 210-1 and 210-2, and is proportional to absolute temperature. In this context, the current-tap path reduces current flow through the p-n junction 210-2 while maintaining current flowing through resistor 12-1 as if the current-tap path was not present, facilitating the implementation of resistor 212-1 as a smaller size (e.g., relative to a size of resistor that would be required to provide an indication of the voltage difference, without the current-tap path).

Transistor 222-4 mimics (or copies) current passing through resistor 212-1 that is passed through resistor 212-2, and provides a voltage at node 208-3 that is proportional to a voltage difference between the p-n junctions 210-1 and 210-2. A comparator 232 compares the voltage at node 208-3 to a reference (e.g., a bandgap reference), and generates an over-temperature output in response to the voltage at node 208-3 exceeding the threshold.

By way of example, the apparatus in FIG. 2 may be operated to provide current of a first amount via transistors 222-1 and 222-3, current of four times the first amount via transistor 222-2, and "N" times the first amount via transistor 222-4 in which "N" may be set to achieve a particular output temperature alert. In this context, the transistor 228-1 flows current in the first amount, with transistor 228-2 flowing a multiple of the first amount (e.g., three times), which reduces the amount of current provided to p-n junction 210-2.

Although the embodiment of FIG. 2 illustrates the transistors as PMOS and NMOS transistors, examples in accordance with the present disclosure are not so limited. For example, the semiconductor junctions can include a variety of transistor types and related connectivity to achieve the desired result.

The apparatuses illustrated by FIG. 1 and/or FIG. 2 may be implemented to perform a variety of methods, including those characterized above. For example, referring to FIG. 1 the apparatuses can be used to pass respective currents through the first and second current paths 104, 106. Each of the current paths has respective first and second common voltage nodes 108-1, 108-2 that provide an output that is proportional to absolute temperature. The first p-n junction 110-1 in the first current path 104 exhibits a first current density and the second p-n junction 110-2 in the second current path 106 exhibits a second current density. The second current density can be proportionally larger than the first current density. Passing current through the second current path 106 can include passing current through a resistor 112 connected between the second p-n junction 110-2 and the second common voltage node 108-2. Further, passing current through the second current path 106 can include diverting a portion of current that flows through the resistor 112 away from the second p-n junction 110-2 at a node 114 connected between the resistors 112 and the second p-n junction 110-2. Passing current through the resistor 112 can include flowing current through the resistor 112 that is proportional to a voltage difference between a junction voltage of the first p-n junction 110-1 and a junction voltage of the second p-n junction 110-2. Further, passing the current through the resistor 112 can include providing the output.

The various embodiments described herein may be combined in certain embodiments, and various aspects of individual embodiments may be implemented as separate embodiments. For instance, aspects of FIG. 1 can be utilized to perform the method described above and/or can be a portion of the apparatus described in FIG. 2. For example, apparatus embodiments in accordance with the present disclosure are not limited to the current paths and/or circuit components as characterized herein. Apparatus embodiments can include additional circuit components, such as a load and/or a power source, arranged with the multi-junction semiconductor circuit and the various paths described herein, among other arrangements.

Various blocks, modules or other circuits may be implemented to carry out one or more of the operations and activities described herein and/or shown in the figures. In these contexts, a "block" (also sometimes "circuit", "logic circuitry", "module", or "path") is a circuit that carries out one or more of these or related operations/activities (e.g., exhibits a current density, diverts a portion of current, or set the common voltage nodes to a common voltage). For example, in certain of the above-discussed embodiments, one or more modules are discreet logic circuits or programmable logic circuits configured and arranged for implementing these operations/activities, as in the circuit modules shown in FIG. 1 (e.g., multi junction semiconductor circuit). In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Based upon the above discussion and illustrations, those skilled in the art will readily recognize that various modifications and changes may be made to the various embodiments without strictly following the exemplary embodiments and applications illustrated and described herein. For example, an apparatus can include current paths and/or circuit components with additional circuits than illustrated by FIGS. 1 and 2. Such modifications do not depart from the true spirit and scope of various aspects of the invention, including aspects set forth in the claims.

What is claimed is:

1. An apparatus comprising:
   a multi junction semiconductor circuit including a first current path and including a second current path, each current path having respective first and second common voltage nodes therein used to provide an output that is proportional to absolute temperature,
   the first current path including a first p-n junction exhibiting a first current density;
   the second current path including a second p-n junction exhibiting a second current density that is proportionally different than the first current density, and including a resistor connected between the second p-n junction and the second common voltage node in the second current path; and
   a current-tap path connected to a node between the resistor and the second p-n junction, the current-tap path being configured and arranged to divert a portion of current that flows through the resistor away from the second p-n junction.

2. The apparatus of claim 1, wherein the first and second p-n junctions are configured and arranged with the resistor and the common voltage nodes to flow current through the resistor that is proportional to a voltage difference between a junction voltage of the first p-n junction and a junction voltage of the second p-n junction, the voltage difference being proportional to absolute temperature.

3. The apparatus of claim 1, wherein the first and second current paths include current sources having transistors that control current flow in the first and second current paths, further including a feedback circuit configured and arranged to set the common voltage nodes to a common voltage by driving gates of the transistors, wherein the resistor is made to appear larger than its physical value via the current-tap path while the common voltage is maintained.

4. The apparatus of claim 1, wherein the current-tap path includes a current mirror circuit configured and arranged to generate the diverted portion of current as a current that proportionally mirrors current in the second current path.

5. The apparatus of claim 4, wherein the first current path, second current path and current-tap path include respective current sources, each current source having a transistor that controls current flow, wherein
   the current source in the current-tap path is configured and arranged to generate an amount of current that matches an amount of current generated by the current source in the second current path, and
   the current mirror circuit is configured and arranged to generate the diverted portion of current by generating current that is a fraction of current generated by the current source in the current-tap path.

6. The apparatus of claim 5, wherein
   the transistors in the current sources are PMOS transistors,
   the current mirror circuit includes first and second NMOS transistors, the NMOS transistors having gates connected to each other and to a drain of the PMOS transistor in the current-tap path, the first NMOS transistor having its drain connected to the drain of the PMOS transistor in the current-tap path, the second NMOS transistor having its drain connected to the common voltage node in the second current path, the second NMOS transistor being configured and arranged to generate the diverted portion of current as a fraction of current flowing through the first NMOS transistor.

7. The apparatus of claim 1, further including a third current path that mirrors current that flows through the resistor in the second current path, the third current path having a third voltage node and being configured and arranged with the first and second current paths to exhibit a voltage at the third voltage node that is proportional to a voltage difference between a junction voltage of the first p-n junction and a junction voltage of the second p-n junction.

8. The apparatus of claim 7, further including a comparator configured and arranged to compare the voltage at the third voltage node to a threshold, and to generate an over-temperature output in response to the voltage at the third voltage node exceeding the threshold.

9. The apparatus of claim 8, further including a bandgap reference circuit configured and arranged to provide a bandgap reference voltage that is about independent of temperature, wherein the comparator is configured and arranged to compare the voltage at the third voltage node to the bandgap reference voltage, using the bandgap reference voltage as the threshold.

10. The apparatus of claim 7, wherein each of the first, second and third current paths includes a current source having a transistor that controls current flow in the current path, further including a feedback circuit configured and arranged to set the common voltage nodes to a common voltage by driving gates of the transistors in the first and second current paths.

11. The apparatus of claim 1, wherein the first p-n junction includes a first diode, and the second p-n junction includes a second diode.

12. The apparatus of claim 1,
   further including a feedback circuit having an amplifier connected to the common voltage nodes and configured and arranged to control current flowing through the respective first and second current paths that maintains the common voltage nodes at a common voltage,
   wherein the feedback circuit is configured and arranged with the first p-n junction and with the second p-n junction to provide a voltage difference between a junction voltage of the first p-n junction and a junction voltage of the second p-n junction that is proportional to absolute temperature, and
   wherein the current-tap path is configured and arranged with the feedback circuit, the resistor, the p-n junctions and the common voltage nodes to provide a voltage drop across the resistor that mimics the voltage difference by controlling current flow through the resistor and through the second p-n junction.

13. A method comprising:
   passing respective currents through first and second current paths, each current path having respective first and second common voltage nodes that provide an output that is proportional to absolute temperature,
   exhibiting, via a first p-n junction in the first current path, a first current density;
   exhibiting, via a second p-n junction in the second current path, a second current density that is proportionally different than the first current density; and
   wherein passing the current through the second current path includes
      passing current through a resistor connected between the second p-n junction and the common voltage node in the second current path, and
      diverting a portion of current that flows through the resistor away from the second p-n junction, at a node connected between the resistor and the second p-n junction.

14. The method of claim 13, wherein passing current through the resistor includes flowing current through the resistor that is proportional to a voltage difference between a junction voltage of the first p-n junction and a junction voltage of the second p-n junction, the voltage difference being proportional to absolute temperature, thereby providing the output.

15. The method of claim 13, further including controlling the flow of current through the first and second paths using a feedback circuit, therein setting the common voltage nodes to a common voltage.

16. The method of claim 13, wherein diverting the portion of current includes generating, with a current mirror circuit, a current that proportionally mirrors current in the second current path.

17. The method of claim 16, wherein passing the respective currents includes generating the currents in respective current sources for each current path, and wherein diverting the portion of current includes
   using another current source to generate an amount of current that matches an amount of current generated by the current source in the second current path, and
   generating the diverted portion of current by generating current that is a fraction of current generated by the other current source.

18. The method of claim 13,
   further including controlling current flowing through the respective first and second current paths based on feedback from the common voltage nodes, therein maintaining the common voltage nodes at a common voltage and providing a voltage difference between a forward-biased junction voltage of the first p-n junction and a forward-biased junction voltage of the second p-n junction that is proportional to absolute temperature, and
   wherein diverting the portion of current includes providing a voltage drop across the resistor that mimics the voltage difference by controlling current flow through the resistor and through the second p-n junction.

19. The method of claim 13, further including mirroring current that flows through the resistor in the second current path, and generating a voltage via the mirrored current, the generated voltage being proportional to a voltage difference between a junction voltage of the first p-n junction and a junction voltage of the second p-n junction.

20. An apparatus for use with a multi-junction semiconductor circuit including first and second current paths each having a current source and a p-n junction via which current generated by the current source passes, the p-n junctions exhibiting current densities that are different, comprising:
   an impedance circuit in the second current path and having a first terminal connected to the current source in the second current path and a second terminal connected to the p-n junction in the second current path;
   a feedback circuit configured and arranged to set a voltage at the p-n junction in the first current path and a voltage at the first terminal to a value that is about equal; and
   a current-tap path connected to the second terminal and being configured and arranged to divert a portion of current that flows from the current source in the second path away from the p-n junction in the second current path, the current-tap path being configured and arranged with the impedance circuit and the feedback circuit to provide current flowing through the impedance circuit that is proportional to absolute temperature, based on a difference between forward-biased junction voltages of the p-n junctions.

* * * * *